(12) United States Patent
Zech

(10) Patent No.: US 8,272,495 B2
(45) Date of Patent: Sep. 25, 2012

(54) BOTTLE TREATMENT SYSTEM HAVING SAFETY UNIT

(75) Inventor: Thomas Zech, Donaustauf (DE)

(73) Assignee: Krones AG, Neutraubling (DE)

( * ) Notice: Subject to any disclaimer, the term of this patent is extended or adjusted under 35 U.S.C. 154(b) by 261 days.

(21) Appl. No.: 12/678,525

(22) PCT Filed: Sep. 30, 2008

(86) PCT No.: PCT/EP2008/008301
§ 371 (c)(1),
(2), (4) Date: May 6, 2010

(87) PCT Pub. No.: WO2009/046910
PCT Pub. Date: Apr. 16, 2009

(65) Prior Publication Data
US 2010/0213026 A1    Aug. 26, 2010

(30) Foreign Application Priority Data
Oct. 5, 2007   (DE) .......................... 10 2007 047 733

(51) Int. Cl.
*F16P 3/08* (2006.01)
*B67C 7/00* (2006.01)

(52) U.S. Cl. .................................. 198/341.01; 340/676

(58) Field of Classification Search ............. 198/341.01, 198/502.1, 502.4, 860.3
See application file for complete search history.

(56) References Cited

U.S. PATENT DOCUMENTS

| | | | | |
|---|---|---|---|---|
| 4,093,066 A | * | 6/1978 | Mitchell et al. ............ | 198/860.5 |
| 6,318,545 B1 | * | 11/2001 | Ross, II ...................... | 198/860.3 |
| 6,325,195 B1 | | 12/2001 | Doherty | |
| 7,284,658 B2 | * | 10/2007 | Wiggins et al. ............ | 198/860.3 |

FOREIGN PATENT DOCUMENTS

| | | |
|---|---|---|
| DE | 2436591 A1 | 2/1976 |
| DE | 2506409 A1 | 8/1976 |
| DE | 2507419 A1 | 9/1976 |
| DE | 3823032 A1 | 1/1990 |
| DE | 19928325 A1 | 12/2000 |
| DE | 102005041531 A1 | 3/2007 |
| GB | 1597918 A | 9/1981 |
| GB | 2261045 A | 5/1993 |

OTHER PUBLICATIONS

International Preliminary Report on Patentability for PCT/EP2008/00831, dated May 11, 2010.

\* cited by examiner

*Primary Examiner* — Mark A Deuble

(74) *Attorney, Agent, or Firm* — Marshall, Gerstein & Borun LLP

(57) ABSTRACT

A bottle treatment system having a safety unit that improves the operational process, including a first accessible safety region, a second accessible safety region and a shut-off device. The first safety region is delimited by a first protection in which a first machine has a drive associated with the first protective region. The second accessible protective region is delimited by a second protection direction following the first protection, with a second machine having at least one further drive associated to the second protective region. A bottle transport from the first machine to the second machine is provided via a transport device, as provided with an individual drive and exceeds the protective region. The shut-off device turns off the machine drive associated with at least one of the respective protective regions and the drive of the transport device exceeding the protective region, if access to protective region is detected.

5 Claims, 1 Drawing Sheet

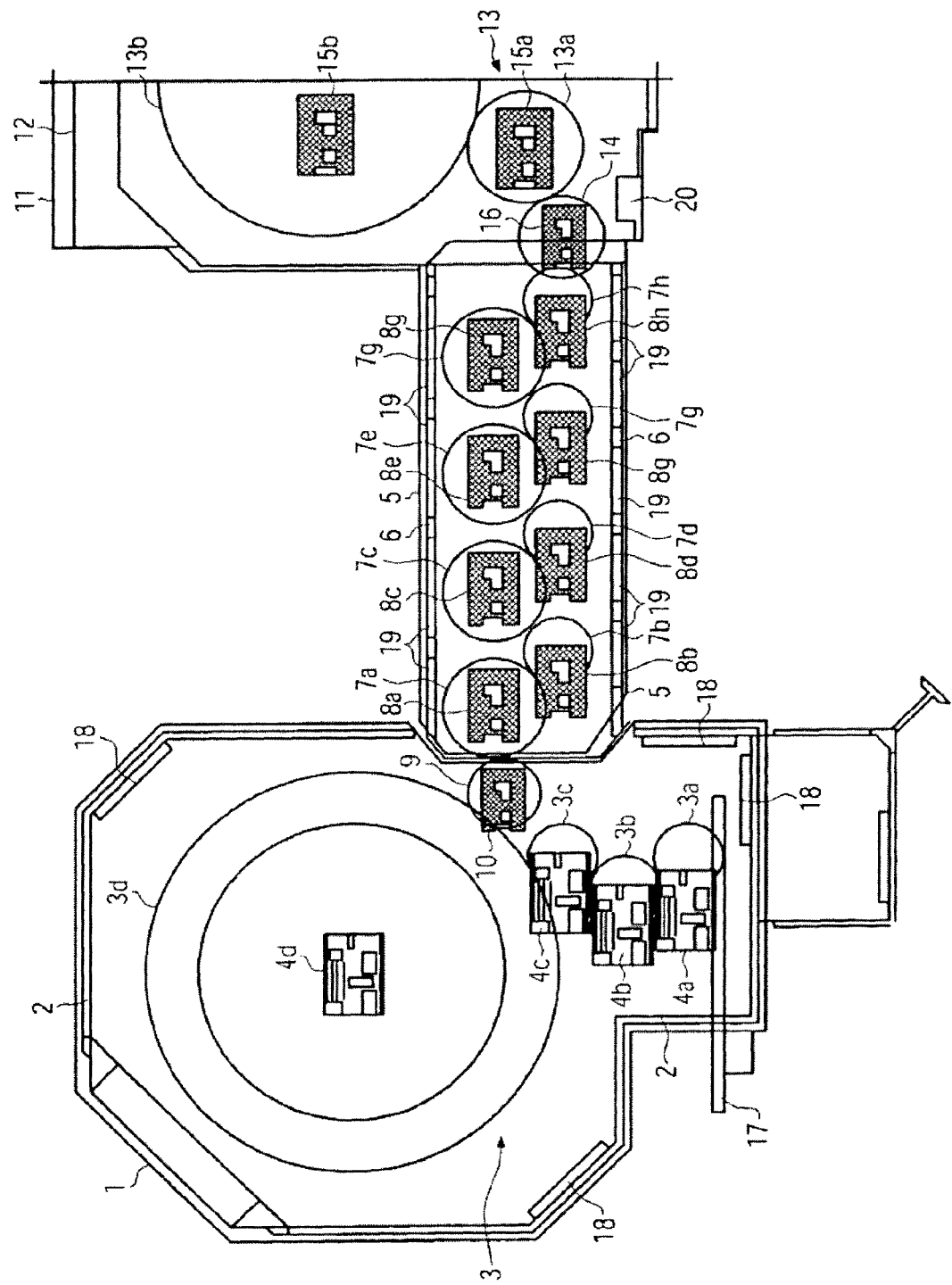

BOTTLE TREATMENT SYSTEM HAVING SAFETY UNIT

CROSS-REFERENCE TO RELATED APPLICATION

The present application claims the benefit of priority of International Patent Application No. PCT/EP2008/008301, filed Sep. 30, 2008, which application claims priority of German Patent Application No. 102007047733.5, filed Oct. 5, 2007. The entire text of the priority application is incorporated herein by reference in its entirety.

FIELD OF THE DISCLOSURE

The present disclosure relates to a bottle treatment system having a safety unit, such as used in beverage bottling operations.

BACKGROUND

Such a bottle treatment system is known from the generic DE 199 28 325. The bottle treatment system is composed of three subsequently arranged machines, which are a stretch blow molding machine with preceding preform feed, a rinsing machine in the form of a rinser as well as a filling machine with an integrated closing station. Each of these machines is protected by a housing whereby a protective region is defined for each of these machines. The machine is designed as a carousel-type machine, in particular as a rotary star, where adjacent machines of two adjacent protective regions are connected via a transport device that exceeds the protective region to ensure a bottle transport path from the one machine to the other machine. Each of the machines comprises an individual drive. Here, the transport device can be either connected to the drive train leading from the drive to the machine to easily obtain a synchronous run between the machine and the transport device, or it comprises a separate drive.

From DE 24 36 591, a further bottle treatment system is known which comprises a filling and closing machine and a downstream labeling machine. A transport device for transferring the bottles is also arranged between these machines. The filling and closing machine provided in a first protective region is driven via a main motor, where the main motor in parallel drives the labeling machine in the adjacent second protective region via a main drive train. In the second protective region, an auxiliary motor as a drive of the labeling machine is provided in addition to be able to auxiliarily drive the labeling machine independently of the filling and closing machine. For this, the main drive train comprises a clutch which separates the labeling machine from the main drive of the filling and closing machine. The transport device is furthermore connected at the main drive train, so that the transport device is also driven via the main drive. The transport device comprises two transport elements embodied as carousel-type elements, the first transport element being connected to the drive train on the side of the filling and closing machine and the second transport element on the side of the labeling machine. A separation of the drive of the two machines via the clutch also causes a separation of the drive of the transport elements.

Another bottle treatment system is disclosed in DE 25 07 419. In this bottle treatment system, too, an independent drive of the filling and closing machine as well as of the labeling machine is realized via an auxiliary motor arranged in the protective region of the labeling machine and a disconnect-type clutch and shifting clutch. The disconnect-type clutch or shifting clutch is actuated with delay if a monitoring device provided in the bottle treatment system reports a closed condition of a bottle lock which prevents further feed of bottles to the filling and closing system, so that the filling and closing machine as well as the labeling machine can run empty. The bottle treatment system further comprises a transport device arranged in the transitional area of the protective regions defined by the filling and closing machine as well as the labeling machine with two transport elements which is driven along via the main drive of the filling and closing machine. The first transport element is connected with the filling and closing machine on the driving end, while the second transport element is connected on the driving end of the labeling machine.

With DE 25 06 409, a further bottle treatment system is disclosed, which only differs from the abovementioned ones in that a conveyor screw for transferring the bottles from the first transport element to the second element is inserted between the two transport elements of the transport device. Here, too, the transport device is, as the transport devices described above, driven via the main drive provided in the protective region of the filling and closing machine.

For cleaning and maintaining the machines of the bottle treatment systems, the protective regions are generally embodied to be accessible. However, to be able to carry out such works directly at the machines or the transport devices, respectively, the drives of the machines have to be switched off for safety reasons and for protecting the personnel to prevent the risk of injuries to the personnel. Thus, during access to the protective region, the drives associated with the protective region are automatically shut off by switches that monitor the entrances. Here, there arises a problem in particular in the transitional region of adjacent protective regions, where usually the transport device for transferring the bottles from the one to the next machine is provided, in that the personnel must be protected from an operation of the transport device if, for example, parallel maintenance and cleaning operations must be performed independently at the machines arranged in the adjacent protective regions. For minimizing conversion, maintenance and fault clearing times, it occurs that a machine has to be operated for example for sample or test runs, i.e. the driven parts of this machine rotate while the driven parts of the other machine stand still to be able to perform required operations directly at the machine components of this machine. For example, the machine is rotated in the first protective region for cleaning purposes while wearing parts have to be replaced at the machine in the adjacent protective region. In the process, the personnel working at the machine in the second protective region must be protected in particular from an operation of the transport device that exceeds the protective region. This is in general achieved in that a mechanical protection is built around the transport device. This measure, however, is very time consuming, leads to delays during the cleaning or maintenance operation, respectively, and is very cost-intensive due to the provision of the mechanical protection.

SUMMARY OF THE DISCLOSURE

Therefore, an aspect underlying the present disclosure is to provide a bottle treatment system having a safety unit which improves an operational process, for example of maintenance and cleaning operations, while safety aspects are taken into consideration.

The disclosure comprises, in part, a comprising a first accessible protective region and a second accessible protective region directly following the first protective region. The first protective region is delimited by a first protection and is provided for accommodating a first machine with at least one drive associated with the first protective region. The second protective region is delimited by a second protection directly following the first protection and is provided for accommodating a second machine with at least one further drive associated with the second protective region. Bottle transport is carried out via the first and the second machine, where the bottle transport from the first to the second machine is accomplished via a transport device that is provided with an individual drive and exceeds the protective region.

The construction of such a bottle treatment system is generally based on a flexible system concept, where flexibility is achieved by a modularity of system components. System component here means a system part, such as for example a system for degermination, a system for filling and a system for closing bottles. A combination of at least two system parts represents a bottle treatment system in the sense of the present disclosure. The individual system parts usually comprise a machine provided for the corresponding course of production that is surrounded by a housing which ensures protection against intervention in the machine region by the personnel. The housing can also be designed such that the machine is additionally protected from external influences, such as moisture, dust or the like. Thereby, sterility within the system part can be ensured.

To achieve the above-mentioned aspect, with the present disclosure a bottle treatment system having a safety unit is provided. The bottle treatment system comprises a safety unit which comprises a first accessible protective region delimited by a first protection and in which a first machine with at least one drive associated with the first protective region is provided. The safety unit of the bottle treatment system further comprises a second accessible protective region which is delimited by a second protection directly following the first protection and in which a second machine with at least one further drive associated with the second protective region is provided. Bottle transport from the first to the second machine is carried out via a transport device that is provided with an individual drive and exceeds the protective region. The safety unit furthermore comprises a shut-off device which shuts off the at least one machine drive associated with the respective protective region and the drive of the transport device if any one of the protective regions is accessed. Thereby, it is ensured in a simple manner that the maintenance and cleaning personnel is protected from an operation of the transport device in case of works to be carried out directly at one of the machines, if for example the machine arranged in an adjacent protective region must be operated for cleaning purposes. The usually provided mechanical protection for the transport device can therefore be eliminated in the bottle treatment system according to the present disclosure, thereby saving costs. Furthermore, quicker change-over times as well as shorter downtimes in case of failures can be achieved, whereby an operational process of the bottle treatment system is in general essentially improved.

In a preferred embodiment of the present disclosure, the first and the second protection each comprise at least one entrance, the shut-off device being designed such that the effected shut-off of the drive is accomplished by opening the entrance. An entrance in the sense of the present disclosure means any possibility of approach or access to the corresponding protective region.

In detail, the entrance can here be a protective door, protective flap, protective window, or the like. At the entrance, a sensor element or switching element associated with the shut-off device can for example be provided which detects the opening of the entrance and transmits a shut-off signal. Thereby, it is reliably ensured that the operator personnel is not subjected to any risk of injury during any works at the machine by an operation of the transport device, as already upon opening of the entrance, long before the protective region is entered, the shut-off of the drives is caused.

According to a further preferred embodiment of the present disclosure, the machines provided in the protective regions comprise several machine parts each with individual drives. Furthermore, a corresponding entrance to each machine part is provided whereby access to the individual machine parts is facilitated in a simple manner. Depending on the size of the machine parts or the size of the entrance, the entrance can also be designed for at least two machine parts.

Preferably, the shut-off device is in this case designed such that upon opening of the entrance, only the drive of the corresponding machine part corresponding to the entrance and directly adjacent thereto is shut-off by the shut-off device. Thereby, not all machine parts of the machine in the protective region are necessarily shut off if an entrance present in the protection is opened. This is in particular advantageous if only one machine part of the machine comprises a defect which can be quickly removed by a simple measure. Thereby, it is not necessary to interrupt the complete operational process of the machine. Furthermore, it is thus also possible to simultaneously carry out various inspection and maintenance works at one machine with several machine parts, where for example one machine part must be operated while another machine part must be maintained in a non-operative state. Due to the fact that the directly adjacent machine parts of the machine part corresponding to the opened entrance are also shut-off, a parallel measure at several machine parts of a machine is possible, whereby downtimes of the bottle treatment system can be further reduced.

According to a further preferred embodiment of the present disclosure, the shut-off device is designed such that a drive supply to the drives of the machines, the machine parts and the transport device can be interrupted. The interruption of the drive supply reliably takes care that no operation of the machine, the machine part or the transport device occurs in case of any failure of the drive, such as for example an unplanned switching on of the drive, and thus a risk of injury of the personnel is further reduced.

Preferably, in a further embodiment of the present disclosure, all drives provided in the bottle treatment system are designed as servo drives. Servo drives belong to the electromagnetic drive systems which, as compared to hydraulic or mechanical drives, respectively, only require drive supply if they are operated. If the drive supply, i.e. the current, to the servo drive is interrupted, the servo drive cannot be automatically switched on, for example by any malfunction. Thereby, a risk of injury of the operator personnel by an unplanned operation of the transport device or of the machine parts can thereby be nearly excluded.

In a further preferred embodiment of the present disclosure, the bottle treatment system with safety unit comprises at least one further protective region delimited by a further protection and directly following the first or second protective region, where a further machine and a further transport device that exceeds the protective region and has an individual drive each is arranged in said protective region. A bottle transport from the one to the further machine of the further protective region is ensured by the further transport device. This preferred embodiment permits, if need be, a further modular construction of the bottle treatment system with further machines, taking into consideration and observing the required safety precautions. If, for example, the machine arranged in the central protective region must be cleaned and rotated in the process, whereas the machines following the central protective region are repaired by replacement with supply parts, by the shut-off device according to the disclosure, the drives of the machines or machine parts associated with these protective regions as well as the drives of the transport devices that exceed the central protective region are shut off Thereby, parallel repair and maintenance works can be advantageously performed at all system components of the bottle treatment system. Thereby, an operational process of a bottle treatment system with more than two protective regions is further improved.

BRIEF DESCRIPTION OF THE DRAWING

Further details, advantages and features of the present disclosure can be taken from the following description of an embodiment in connection with the drawing, which shows a schematic representation of an embodiment of a bottle treatment system having a safety unit according to the present disclosure.

DETAILED DESCRIPTION OF THE PREFERRED EMBODIMENT

The FIGURE shows a schematic representation of an embodiment of a bottle treatment system having a safety unit according to the present disclosure. The bottle treatment system comprises a first protective region 1, a second protective region 5 and a third protective region 11. The protective regions 1, 5 and 11 are arranged such that the first protective region 1 directly follows the second protective region 5, and the second protective region 5 directly follows the third protective region 11. The individual protective regions 1, 5 and 11 each comprise a protection 2, 6 and 12. Here, for the sake of simplicity, only half of the third protective region 11 with its third protection 12 is represented. Further protective regions can follow the third protective region 11. In the first protective region 1, a machine 3 with four machine parts 3a, 3b, 3c, 3d, designed as carousel-type machine parts are provided. Each of the machine parts 3a, 3b, 3c and 3d comprises an individual drive 4a, 4b, 4c and 4d, which drives the machine parts 3a, 3b, 3c and 3d such that directly adjacent machine parts 3a, 3b; 3c, 3d rotate in opposite directions. Furthermore, a bottle feed 17 is associated with the first protective region 1 which feeds the bottles from outside into the first protective region 1 to the first machine part 3a of the machine 3. The first machine part 3a receives the bottles of the bottle feed 17 and forwards them by rotation to the second machine part 3b. The bottle transport from the second machine part 3b via the third machine part 3c to the fourth machine part 3d is performed correspondingly. Thereby, the bottle transport path from the first machine part 3a to the fourth machine part 3d can be accomplished by the shortest path.

In the first protective region 1, a transport device 9 that exceeds the protective region and has an individual drive 10 is furthermore provided. The transport device 9 that exceeds the protective region also runs oppositely with respect to the fourth machine part 3d, receives the bottle transported by the fourth machine part 3d and forwards the same to a first machine part 7a of the second machine 7 in the second protective region 5 directly following the first protective region 1.

The first machine 3 associated with the first protective region 1 is for example a degermination system where the bottles are degerminated. The second machine 7 associated with the second protective region 5 is for example a filling system in which a sterilized product is filled into the degerminated bottles. The second protective region 5 is here surrounded by a second protection 6 which comprises the second machine 7 with second machine parts 7a to 7h, where each of these machine parts 7a to 7h has an individual drive 8a to 8h. The individual machine parts 7a to 7h of the second machine 7 are also designed as carousel-type parts and rotate correspondingly as the individual machine parts 3a to 3d of the first machine 3 in opposite directions.

The third machine 13 arranged in the third protective region 11 is designed, for example, as closing system. In the closing system, the closures are degerminated in a disinfection bath and subsequently placed on the bottles fed by the filling system in the aseptic closer. The third protective region 11 here comprises a third protection 12, which directly follows the second protection 6 of the second protective region 5. The bottles from the second protective region 5 are transferred to a machine part 13a of the third machine 13 via a transport device 14 with individual drive 16. The transport device 14 is also designed as carousel-type device and rotates in the opposite direction with respect to the last machine part 7h of the second machine 7 in the second protective region 5 as well as the first machine part 13a of the third machine 13 in the third protective region 11. The bottle transported via the transport device 14 is transported further via the first machine part 13a to the second machine part 13b of the machine 13. Here, too, the individual machine parts 13a and 13b are designed as carousel-type parts and rotate in opposite directions. Each of these machine parts 13a, 13b comprises an individual drive 15a and 15b.

In the first, second and third protections 1, 2 and 3, several first, second and third entrances 18, 19 and 20 are each provided which permit approach to the corresponding protective regions 1, 5 and 11 as well as access to the individual machine parts 3a to 3d of the first machine 3, the machine parts 7a to 7h of the second machine 7 and the machine parts 13a and 13b of the third machine 13. The entrances 18, 19 and 20 are connected to the non-depicted shut-off device of the bottle treatment system via non-depicted components such that upon opening of one of the entrances 18, 19 and 20, a shut-off signal is transmitted to the shut-off device, so that the shut-off device shuts off the drive of the machine associated with the opened entrance and the drive or drives, respectively, of the transport devices following this machine. The coupling between the entrances 18, 19 and 20 and the shut-off device, however, can here also be designed such that only the drive of the machine part associated with the opened entrance as well as the drives of these directly following machine parts or the transport device is shut off. Here, the shut-off device comprises an apparatus with which a shut-off of the drives of individual machine parts and transport devices or a shut-off of all drives of a machine as well as the drive of the adjacent transport device can be selected when one or more entrances are opened.

The invention claimed is:

1. A bottle treatment system, comprising:
a first machine with at least one first drive;
a second machine with at least one second drive;
a bottle transport device having a bottle transport drive and extending between the first machine and the second machine; and
a safety unit comprising:
a first accessible protective region bound by a first protection, the first machine being disposed in the first accessible protective region, a second accessible protective region bound by a second protection directly adjacent the first protection of the first accessible protective region, the second machine being disposed in the second accessible protective region, the transport device extending between the first and second protections, the first machine and/or the second machine comprising a plurality of driven machine parts, each driven machine part having an individual machine part drive, the first and second protections each comprising at least one entrance disposed at a location corresponding to one of the driven machine parts disposed within the respective protection, and a shut-off device connected to the first drive, the second drive, the bottle transport drive, the individual machine part drives, and with a plurality of access signal transmitters, each of the plurality of access signal transmitters associated with one of the entrances in the protections and, upon an entrance in the first protection being opened, the shut-off device being configured to switch off (a) the bottle transport drive and (b) the first drive and/or one or more of the individual machine part drives disposed in the first protection to enable maintenance, cleaning, part replacement or fault-clearing of the first machine and/or the individual machine parts in the first protection, and upon an entrance in the second protection being opened, the shut-off device being configured to switch off (a) the bottle transport drive and (b) the second drive and/or one or more of the individual machine part drives disposed in the second protection to enable maintenance, cleaning, part replacement or fault-clearing of the second machine and/or the individual machine parts in the second protection.

2. The bottle treatment system according to claim 1, wherein the shut-off device is configured to switch off the bottle transport drive and exclusively the individual machine part drive located directly behind the opened entrance.

3. The bottle treatment system according to claim 1, wherein the bottle transport drive and/or the individual machine part drives are switched off by interrupting a drive energy supply to the respective drive.

4. The bottle treatment system according to claim 1, wherein the bottle transport drive, the first drive, the second drive, and the individual machine part drives each comprises an electromagnetic drive.

5. The bottle treatment system according to claim 1, further comprising:

at least one further protective region bound by a further protection having at least one entrance and directly following the first or second protective region, a further machine, and a further transport device, the further transport device extending between the further protection and the first or second protection, the further machine having at least one further machine drive and the further transport device having at least one further transport drive connected to the shut-off device.

* * * * *